(12) United States Patent
Choi et al.

(10) Patent No.: US 7,619,837 B2
(45) Date of Patent: Nov. 17, 2009

(54) VARIFOCAL OPTICAL DEVICE

(75) Inventors: Seung-tae Choi, Osan-si (KR);
Tae-sang Park, Suwon-si (KR);
Jeong-yub Lee, Seoul (KR); Jong-oh Kwon, Suwon-si (KR); Che-heung Kim, Yongin-si (KR); Seung-wan Lee, Suwon-si (KR); Woon-bae Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/036,316

(22) Filed: Feb. 25, 2008

(65) Prior Publication Data
US 2009/0097140 A1 Apr. 16, 2009

(30) Foreign Application Priority Data
Oct. 15, 2007 (KR) ............ 10-2007-0103546

(51) Int. Cl.
*G02B 7/02* (2006.01)

(52) U.S. Cl. .................. 359/811; 359/813

(58) Field of Classification Search ............. 359/811, 359/813, 814, 819, 820, 824, 825
See application file for complete search history.

(56) References Cited

U.S. PATENT DOCUMENTS

| | | | |
|---|---|---|---|
| 6,624,549 B2 * | 9/2003 | Takeuchi et al. | 310/330 |
| 6,703,762 B1 * | 3/2004 | Okada | 310/317 |
| 6,801,493 B2 * | 10/2004 | Jang et al. | 369/221 |
| 6,880,936 B2 * | 4/2005 | Shin | 353/99 |
| 6,943,966 B2 * | 9/2005 | Konno | 359/819 |
| 7,170,665 B2 * | 1/2007 | Kaneko et al. | 359/290 |
| 7,202,591 B2 * | 4/2007 | Arbogast et al. | 310/332 |

* cited by examiner

*Primary Examiner*—Timothy J Thompson
(74) *Attorney, Agent, or Firm*—Sughrue Mion, PLLC

(57) ABSTRACT

A varifocal optical device is provided. The varifocal optical device includes an optical lens, an actuator unit connected with the optical lens and having two areas that are bending-deformed in opposite directions to each other when a voltage is applied thereto, and a supporting unit to support the actuator unit, so that a focus of the optical lens is varied by the bending deformation when the voltage is applied to the actuator unit. Thereby, a driving displacement of the varifocal optical lens can be maximized.

12 Claims, 7 Drawing Sheets

VARIFOCAL OPTICAL DEVICE

CROSS-REFERENCE TO RELATED APPLICATIONS

This application claims priority from Korean Patent Application No. 2007-103546, filed on Oct. 15, 2007, the entire disclosure of which is incorporated herein by reference.

BACKGROUND OF THE INVENTION

1. Field of the Invention

The present invention relates to a varifocal optical device. More particularly, the present invention relates to a varifocal optical device of using an actuator with areas, which are bending-deformed in different directions to each other.

2. Description of the Related Art

A modern wireless mobile device is developing as a multipurpose electronic apparatus including various functions, such as a camera function, a game function, a music reproducing function, a broadcasting function, an internet function, etc., besides a telephone function and a message transmission function. With this, it is making an attempt to incorporate more functions in less space.

However, since a camera module is made up of a lens, an image sensor, a printed circuit board, etc. causing the increase of volume and thickness, it is difficult for the camera module to reduce a size. Particularly, although to improve an image in quality, the camera module needs an auto focusing function, an optical image stabilizing function, a zoom function, etc., it is difficult to add such functions into the camera module due to an restriction in size.

As typical methods for embodying the auto focusing function in the conventional camera, there are known a method of using a stepping motor, a method of using a voice coil motor, a method of using a piezoelectric actuator, a method of using a liquid lens, etc. Among these methods, the method of using the stepping motor and the method of using the voice coil motor are disadvantageous in that it is difficult to miniaturize a size of the camera module. The method of using the piezoelectric actuator presents a problem in that a maximum strain is small and a processing temperature is high. Also, the method of using the liquid lens presents a problem in that it is difficult to fill in a liquid without generating bubbles.

SUMMARY OF THE INVENTION

The present invention has been developed in order to solve the above problems in the related art. Accordingly, an aspect of the present invention is to provide a varifocal optical device capable of increasing a focus adjusting range.

According to an aspect of an exemplary embodiment of the present invention, there is provided a varifocal optical device including an optical lens, an actuator unit connected with the optical lens and having two areas that are bending-deformed in opposite directions to each other when a voltage is applied thereto, and a supporting unit to support the actuator unit, so that a focus of the optical lens is varied by the bending deformation when the voltage is applied to the actuator unit.

At this time, the actuator unit may include a common ground layer, and first and second electrode layers disposed on both sides of the common ground layer and formed, so that one areas thereof opposite to each other are removed to allow the first and the second electrode layers to be divided into the two areas, based on the removed areas, respectively.

Alternatively, the actuator unit may include a first connecting part connected with the optical lens and formed in a circle shape, a second connecting part connected with the supporting unit, and an actuator connected between the first and the second connecting parts, and formed in a shape having a predetermined curvature to be spaced apart and in parallel from the first connecting part, the actuator having the two areas that are bending-deformed in opposite directions to each other when the voltage is applied thereto.

Here, preferably, but not necessarily, the actuator unit is extended along an edge of a side of the supporting unit to form a bar shape, and has an end forming a shape bent and connected in a direction of the optical lens.

Also, the supporting unit may be formed in a polygonal shape, and the actuator unit may include a plurality of actuators, which are connected to sides of the supporting unit and have the two areas that are bending-deformed in opposite directions to each other when the voltage is applied thereto, respectively.

Here, preferably, but not necessarily, the actuator unit includes a bimorph actuator divided into the two areas based on a center area thereof.

At this time, preferably, but not necessarily, the plurality of actuators is separately driven to one another.

In this case, preferably, but not necessarily, the actuator is a layered actuator, which is made up of more than three layers.

Also, the actuator unit may be formed of a dielectric elastomer, such as an arcrylate or a silicon.

Alternatively, the actuator unit may be formed of one of a ferroelectric polymer and a relaxer ferroelectric polymer.

At this time, preferably, but not necessarily, the actuator unit is made of a polymer material formed of one of an ion-irradiated P(VDF-TrFE) and P(VDF-TrFE-CFE).

BRIEF DESCRIPTION OF THE DRAWINGS

The above and other aspects of the present invention will be more apparent by describing exemplary embodiments of the present invention with reference to the accompanying drawings, in which.

Throughout the drawings, the same drawing reference numerals will be understood to refer to the same elements, features, and structures.

DETAILED DESCRIPTION OF THE EXEMPLARY EMBODIMENTS

Hereinafter, a detailed description will be made about a varifocal optical device according to exemplary embodiments of the invention with reference to the accompanying drawings.

Figure 1:
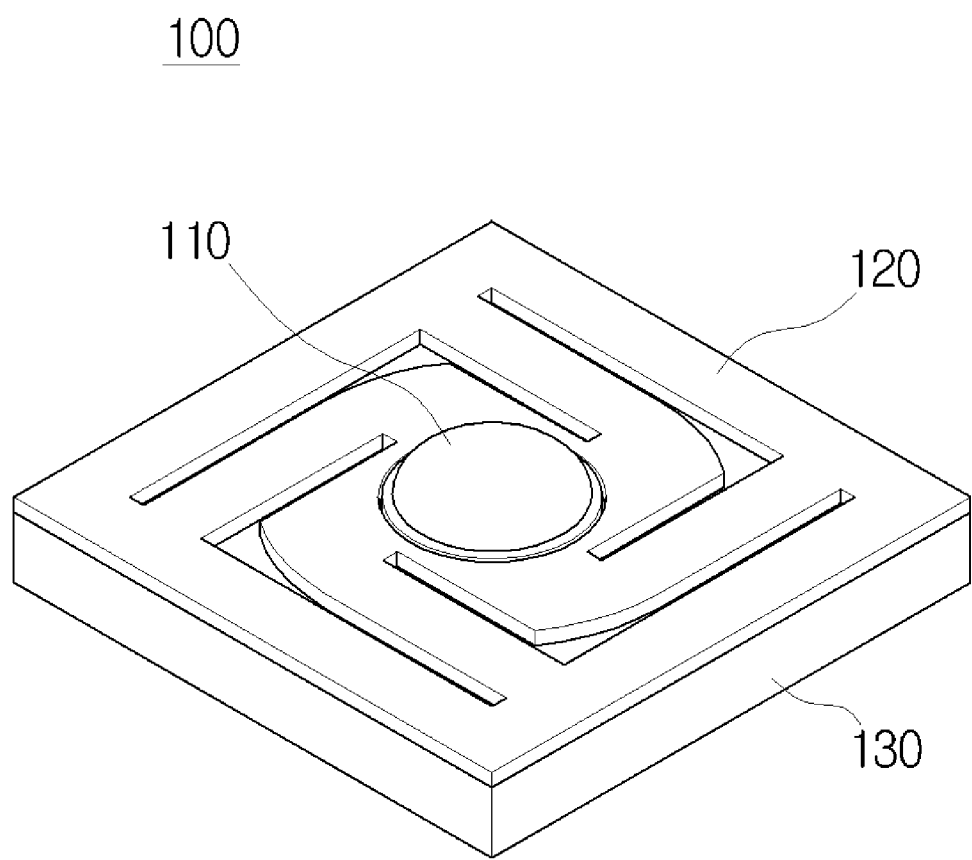
FIG. 1 is a perspective view exemplifying a varifocal optical device according to an exemplary embodiment of the present invention.
Figure 2:
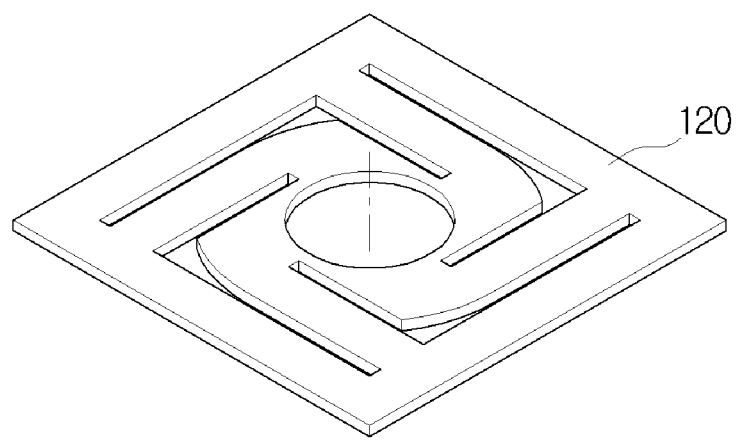
FIG. 2 is an exploded view exemplifying the varifocal optical device according to the exemplary embodiment of the present invention.
Figure 2:
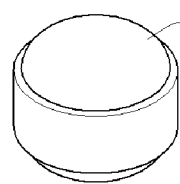
Figure 2:
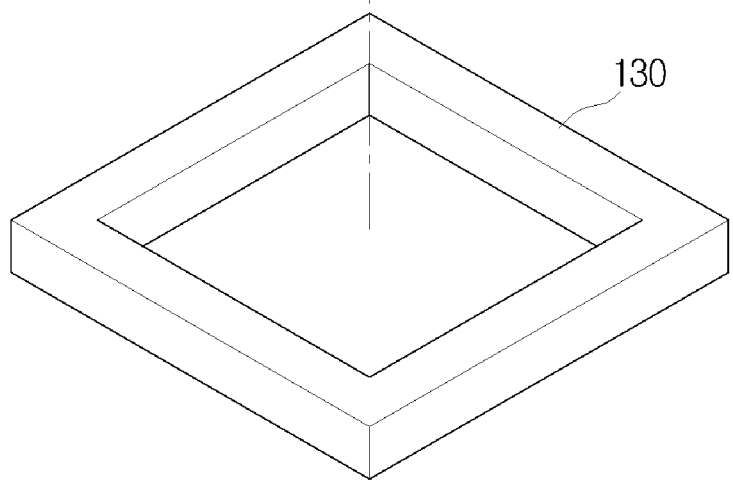

FIG. 1 is a perspective view exemplifying a varifocal optical device according to an exemplary embodiment of the present invention, and FIG. 2 is an exploded view exemplifying the varifocal optical device according to the exemplary embodiment of the present invention. Referring to FIGS. 1 and 2, the varifocal optical device 100 according to the exemplary embodiment of the present invention includes an optical lens 110, an actuator unit 120, and a supporting unit 130.

The optical lens 110 may be all of lenses, which are applicable to a camera module. Generally, preferably, but not necessarily, the optical lens 110 is preferably formed in a circle shape. However, as occasion demands, a tetragonal optical lens may be used. Also, to improve optical characteristics, such as light transmittance or chromatic aberration, an optical coating may be formed on a surface of the optical lens 110.

The actuator unit 120 has two areas, which are bending-deformed in opposite directions to each other when a voltage is applied thereto, and is connected with the optical lens 110. To be more specific, as illustrated in FIG. 1, the actuator unit 120 is configured, so that it forms a bar shape extended along an edge of a side of the supporting unit 130, and at an extended end thereof, is bent and connected in a direction of the optical lens 110.

The actuator unit 120 is formed of a dielectric elastomer, such as an arcrylate or a silicon. Alternatively, the actuator unit 120 may be formed of one of a ferroelectric polymer and a relaxer ferroelectric polymer. Also, the actuator unit 120 is made of a polymer material formed of one of an ion-irradiated P(VDF-TrFE) and P(VDF-TrFE-CFE).

The supporting unit 130 supports the actuator unit 120, so that a focus of the optical lens is varied by the bending deformation of the actuator unit 120 when a voltage is applied to the actuator unit 120. The supporting unit 130 may be formed in a circle or polygonal shape. To mass-produce with a batch process thus to reduce manufacture costs, preferably, but not necessarily, the supporting unit 130 is formed in a tetragonal shape. However, considering that a general lens module of an optical apparatus, such as a camera or the like, has a circle shape, the supporting unit 130 may be formed in the circle shape. The supporting unit 130 may be made of any one of materials, such as a silicon, a glass, and a polymer.

Referring to FIGS. 1 and 2, the supporting unit 130 is formed in the tetragonal shape, and the actuator unit 120 includes a plurality of actuators, which are connected to sides of the supporting unit and have the two areas that are bending-deformed in opposite directions to each other when the voltage is applied thereto, respectively. Also, according to the exemplary embodiment of the invention, as illustrated in FIG. 2, the varifocal optical device 100 can be assembled in a sheet form. Thus, the varifocal optical device 100 is advantageous in that a fabrication procedure is simplified.

Figure 3:
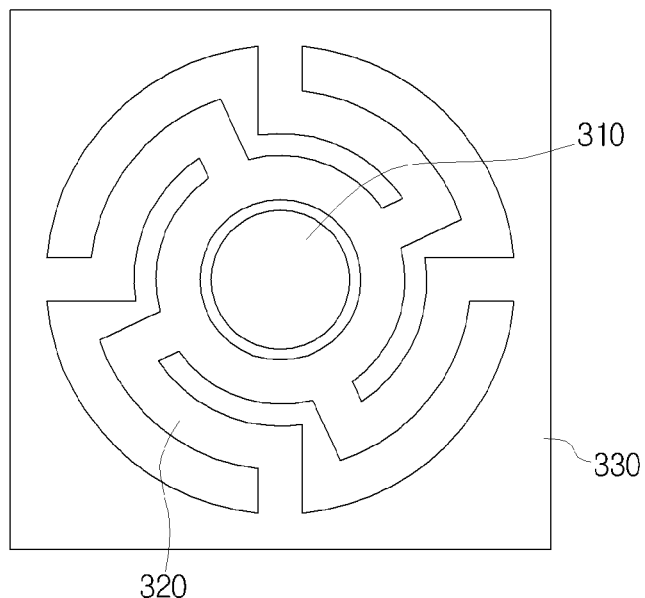
FIG. 3 is a top plan view exemplifying a varifocal optical device according to another exemplary embodiment of the present invention.
Figure 4:
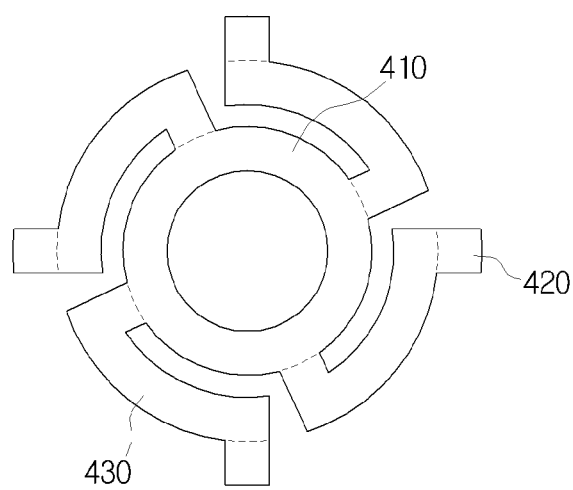
FIG. 4 is a top plan view exemplifying an actuator unit of the varifocal optical device according to another exemplary embodiment of the present invention.

FIG. 3 is a top plan view exemplifying a varifocal optical device according to another exemplary embodiment of the present invention, and FIG. 4 is a top plan view exemplifying an actuator unit of the varifocal optical device according to another exemplary embodiment of the present invention.

Referring to FIGS. 3 and 4, the varifocal optical device 300 according to another exemplary embodiment of the present invention includes an optical lens 310, an actuator unit 320, and a supporting unit 330. In this case, to allow the optical lens 310 to have a maximum displacement in a vertical direction within a size of the supporting unit 330, a shape of the actuator unit 320 is differently embodied from that of the actuator unit of FIG. 1 because it can be changed in various forms without being limited to one as described above.

That is, the actuator unit 320 includes a first connecting part 410, a second connecting part 420, and an actuator 430. The first connecting part 410 is connected with the optical lens 310, and formed in a circle shape. The second connecting part 420 is connected with the supporting unit 330. The actuator 430 is connected between the first and the second connecting parts 410 and 420, and formed in a shape having a predetermined curvature to be spaced apart and in parallel from the first connecting part 410. The actuator 430 has two areas that are bending-deformed in opposite directions to each other when a voltage is applied thereto.

In the embodiments illustrated in FIGS. 1 through 4, the actuator unit may be embodied as a bimorph polymer actuator.

Figure 5A:
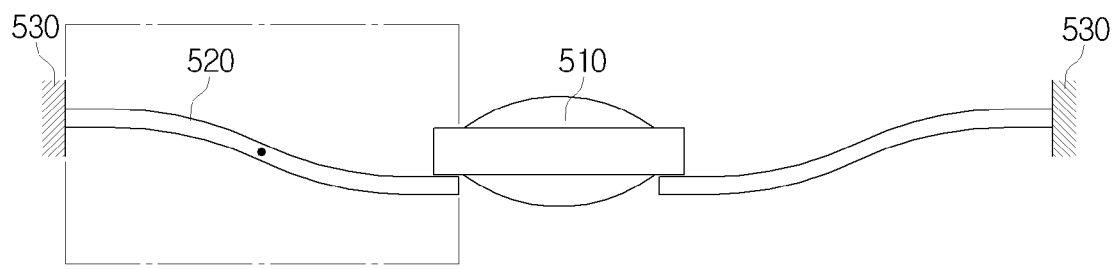
FIG. 5A is a side elevation exemplifying a principle of adjusting a focus of the varifocal optical device.
Figure 5B:
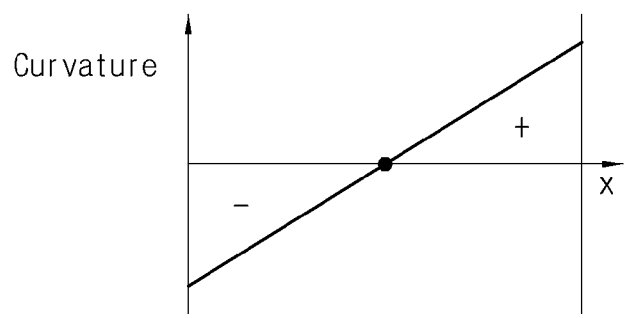
FIG. 5B is a graph exemplifying a change in curvature according to positions of an actuator of the varifocal optical device of FIG. 5A.

FIG. 5A is a side elevation exemplifying a principle of adjusting a focus of the varifocal optical device. In FIG. 5A, an actuator 520 may be embodied as the bimorph polymer actuator. FIG. 5B is a graph exemplifying a change in curvature according to positions of the actuator of the varifocal optical device of FIG. 5A.

Referring to FIG. 5A, there is illustrated an example of construction in which an optical lens 510 and one bimorph polymer actuator 520 are connected with each other. It can be appreciated that in FIG. 5A, the bimorph polymer actuator 520 was applied with a voltage, so that it was bending-deformed. FIG. 5B shows curvatures in respective positions of a portion of the bimorph polymer actuator 520 as illustrated in a dotted line of FIG. 5A. It can be appreciated that minus (−) curvatures are an upwardly convexed portion and plus (+) curvatures are a downwardly convexed portion. Thus, with the bending deformation in the upwardly and the downwardly convexed form, the bimorph polymer actuator 520 can provide a maximum displacement in a vertical direction between the optical lens 510 and the supporting unit 530 within a size of the supporting unit 530. If the bimorph polymer actuator 520 is not supplied with a voltage, it is not bending-deformed, so that it is flat, whereas if supplied with the voltage, bending-deformed to move or adjust the optical lens 510 in either an upward direction or a downward direction. In FIG. 5A, there is illustrated a state where when supplied with the voltage, the bimorph polymer actuator 520 is bending-deformed to adjust the optical lens 510 in the downward direction.

On the other hand, although FIG. 5A illustrates a structure that one optical lens 510 is connected to the supporting unit 530 through the actuator 520, the present invention is not limited thereto. For instance, more than two optical lenses may be connected in parallel to the supporting unit 530 through the actuator 520. In this case, the more than two optical lenses can move in the vertical direction to carry out a zoom function.

Figure 6A:
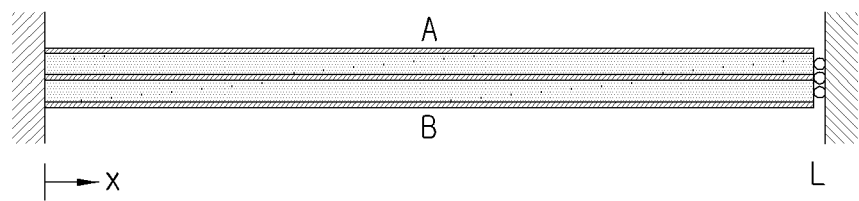
FIG. 6A is a cross-sectional view exemplifying a conventional bimorph polymer actuator.
Figure 6B:
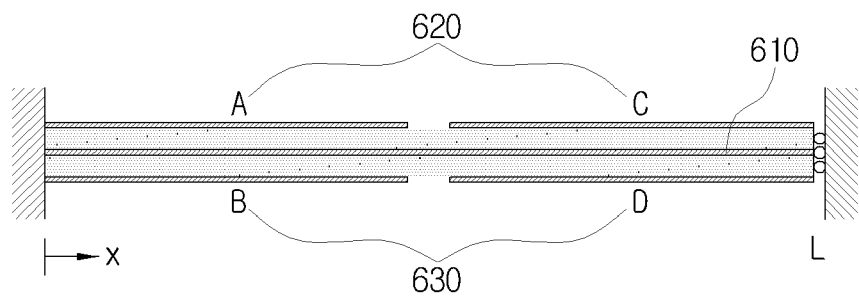
FIG. 6B is a cross-sectional view exemplifying a bimorph polymer actuator, which is applied to the varifocal optical device of the present invention.
Figure 6C:
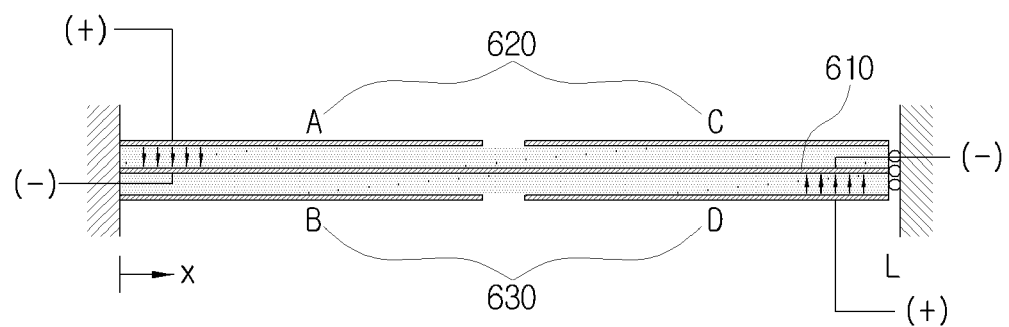
FIG. 6C is a cross-sectional view explaining a state of the bimorph polymer actuator of FIG. 6B where it is supplied with a voltage.

FIG. 6A is a cross-sectional view exemplifying a conventional bimorph polymer actuator, FIG. 6B is a cross-sectional view exemplifying a bimorph polymer actuator, which is applied to the varifocal optical device of the present invention, and FIG. 6C is a cross-sectional view explaining a state of the bimorph polymer actuator of FIG. 6B where it is supplied with a voltage.

Referring to FIG. 6A, the conventional bimorph polymer actuator is made up of three electrode layers. The electrode layer, which is disposed in the middle, as a basic node, is an electrode layer for common ground. One of the electrode layers A and B, which are disposed on and under the electrode layer for common ground, is supplied with a plus (+) voltage. If the plus (+) voltage is supplied to the electrode layers A, the bimorph polymer actuator is deformed in an upwardly convexed shape on the whole, and if to the electrode layers B, it is deformed in a downwardly convexed shape on the whole. A portion designated as a mark L generally used in the art functions to move only in upward and downward directions without moving in left and right directions, even though the bimorph polymer actuator is expanded in the left and the right directions as the plus (+) voltage is supplied to either the electrode layers A of the electrode layer B.

Referring to FIG. 6B, the bimorph polymer actuator of the varifocal optical device of the present invention includes a common ground layer 610, and first and second electrode layers 620 and 630. Different from the conventional bimorph polymer actuator of FIG. 6A, the bimorph polymer actuator of the varifocal optical device of the present invention has a discontinuous shape that the first and the second electrode layers 620 and 630 are cut off at the middles thereof, respectively. That is, the first electrode layer 620 can be divided into areas A and C, and the second electrode layer 630 can be divided into areas B and D.

Thus, different from the conventional bimorph polymer actuator, which is bending-deformed by supplying the plus (+) voltage to only either the electrode layer A or the electrode layer B, as illustrated in FIG. 6A, the bimorph polymer actuator of the varifocal optical device of the present invention can be bending-deformed by supplying the plus (+) voltage to the area A of the first electrode layer 620 and at the same time, supplying the plus (+) voltage the area D of the second electrode layer 630, as illustrated in FIGS. 6B and 6C.

When the plus (+) voltage is supplied to the area A of the first electrode layer 620, an electric field is formed in a direction of the common ground layer 610 from the area A, so that a distance between the area A and the common ground layer 610 is narrowed and the area A is lengthened in a longitudinal direction (a direction of x) by a Poisson's effect. As a result, the areas A and B come to have a minus (−) curvature in an upwardly convexed form. In the same manner, when the same plus (+) voltage as that supplied to the area A of the first electrode layer 620 is supplied to the area D of the second electrode layer 630, the area D of the second electrode layer 630 is lengthened in a longitudinal direction (the direction of x), as described above. As a result, the areas C and D come to have a plus (+) curvature in a downwardly convexed form.

To the contrary, when the plus (+) voltage is supplied to the area C of the first electrode layer 620 and at the same time, to the area B of the second electrode layer 630, the area C of the first electrode layer 620 is lengthened in a longitudinal direction (the direction of x) and the area B of the second electrode layer 630 is lengthened in a longitudinal direction (the direction of x). As a result, the areas A and B come to have a plus (+) curvature in a downwardly convexed form, and the areas C and D come to have a minus (−) curvature in an upwardly convexed form.

Figure 7A:
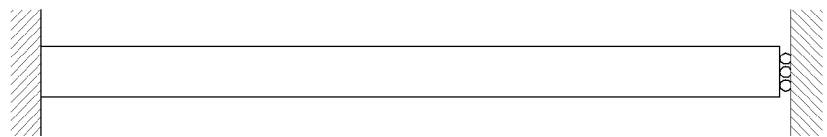
FIG. 7A is a view exemplifying an outward shape of the bimorph polymer actuator of the varifocal optical device of the present invention.
Figure 7B:
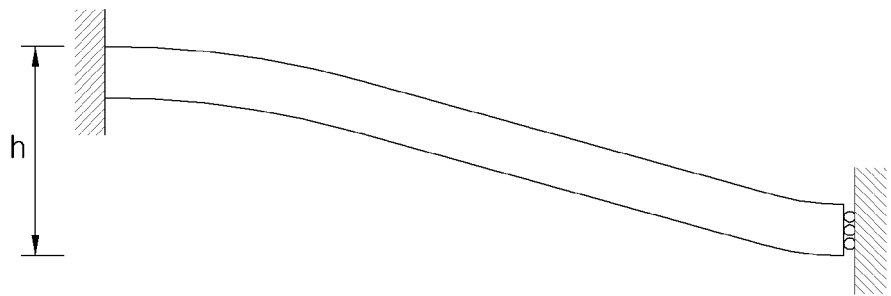
FIG. 7B is a view exemplifying an outward shape of a conventional bimorph polymer actuator when it is supplied with a predetermined voltage.
Figure 7C:
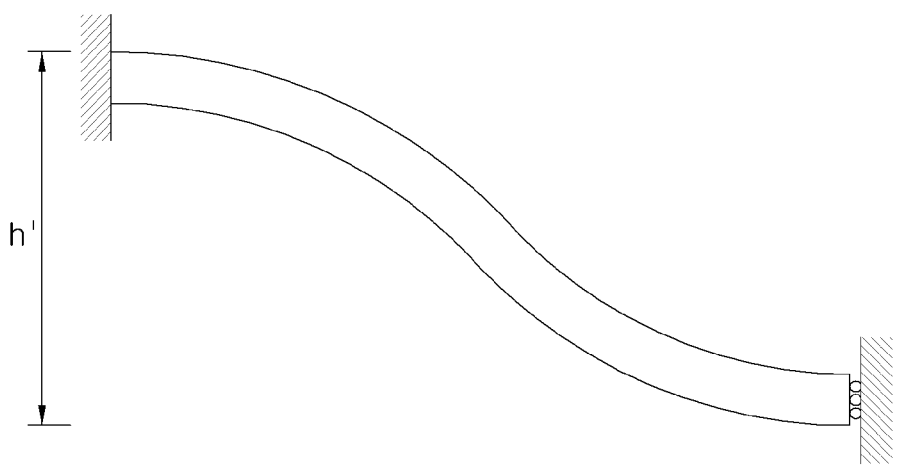
FIG. 7C is a view exemplifying an outward shape of the bimorph polymer actuator of the varifocal optical device of the present invention when it is supplied with the predetermined voltage.

FIG. 7A is a view exemplifying an outward shape of the bimorph polymer actuator of the varifocal optical device of the present invention, FIG. 7B is a view exemplifying an outward shape of a conventional bimorph polymer actuator when it is supplied with a predetermined voltage, FIG. 7C is a view exemplifying an outward shape of the bimorph polymer actuator of the varifocal optical device according to the exemplary embodiment of the present invention when it is supplied with the predetermined voltage. If the conventional bimorph polymer actuator as illustrated in FIG. 6A is supplied with the predetermined voltage, it is deformed and displaced by a height h in a vertical direction. To the contrary, if the bimorph polymer actuator of the varifocal optical device of the present invention as illustrated in FIG. 6B is supplied with the same predetermined voltage, it is deformed and displaced by a height h' (h'>h) in the vertical direction.

That is, according to the exemplary embodiment of the present invention, the portion having the plus (+) curvature and the portion having the minus (−) curvature of the bimorph polymer actuator can be separately driven, thereby maximizing the displacement in the vertical direction. The bimorph polymer actuator of the varifocal optical device according to the exemplary embodiment of the present invention as illustrated in FIG. 7C can relatively reduce a driving voltage, as compared with the conventional bimorph polymer actuator of FIG. 7B.

On the other hand, referring to FIG. 1, the bimorph polymer actuator is made up of four bimorph polymer actuators, each of which is separately driven. Thus, the four bimorph polymer actuators generate different displacements in vertical direction, so that the optical lens is not horizontally disposed, but inclined. The phenomenon that the optical lens is inclined as described above can be adjusted by applying different voltages to the four bimorph polymer actuators. Also, with a feedback control to each of the four bimorph polymer actuators, an optical image stabilizing function can be carried.

Figure 8:
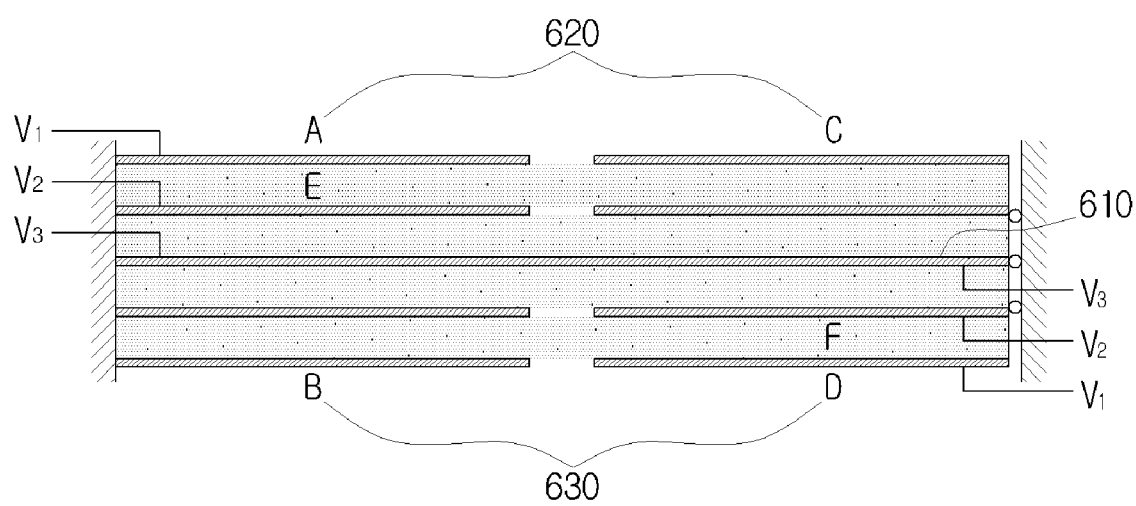
FIG. 8 is a cross-sectional view exemplifying an example of a bimorph polymer actuator made up of a plurality of layers in the varifocal optical device of the present invention.

FIG. 8 is a cross-sectional view exemplifying an example of a bimorph polymer actuator made up of a plurality of layers in the varifocal optical device of the present invention. Referring to FIG. 8, electrode layers E and F are additionally disposed between the common ground layer 610 and the first electrode layer 620 and between the common ground layer 610 and the second electrode layer 630, respectively. That is, different from the bimorph polymer actuator of FIG. 6B, in the bimorph polymer actuator of FIG. 8, even the electrode layers E and F, which are additionally included, can be applied with the voltage, so that the bimorph polymer actuator reduces a driving voltage applied thereto.

For instance, if in the bimorph polymer actuator of FIG. 6B, a driving voltage, which is applied between the first electrode layer 620 and the common ground layer 610, is 10 V, in the bimorph polymer actuator of FIG. 8, voltages V2 and V1 can be applied with 5 V and 0 V, respectively, when a common ground voltage V3 is 0 V. In this case, an electric field is applied in a direction of the common ground layer 610 from the electrode layer E and at the same time, an electrode layer is applied in a direction of the electrode layer A from the electrode layer E, so that the electric fields are applied in opposite directions to each other. However, the bimorph polymer actuator is deformed, so that distances between the electrode layers are narrowed regardless of the electric field-applying directions and the electrode layers having the narrowed distances therebetween are lengthened in longitudinal directions by the Poisson's effect. Thus, if the bimorph polymer actuator is embodied as made up of the plurality of layers, it can reduce the driving voltage by alternately applying the voltages V1, V2, and V3, for example, 0 V, 5 V, and 0 V, as compared with the bimorph polymer actuator made up of a single layer.

Although in FIG. 6B, the actuator is illustrated as the layered actuator made up of the three layers including the common ground layer and the two electrode layers having the voltages V1 and V2, it can be configured as a layered actuator made up of more than three layers by adding a plurality of electrode layers between the common ground layer and the electrode layer having the maximum voltage, as illustrated in FIG. 8.

The foregoing exemplary embodiments are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A varifocal optical device, comprising:
   an optical lens;
   an actuator unit comprising a plurality of actuator elements, connected with the optical lens, each actuator element having a first end and a second end, which bend in opposite directions when voltage is applied thereto; and
   a supporting unit which supports the actuator unit;
   wherein a focus of the optical lens is varied by the bending of the first and second ends when voltage is applied to the actuator unit; and
   wherein the plurality of actuator elements are driven separately from one another.

2. The device as claimed in claim 1, wherein at least one of the plurality of actuator elements comprises:
   a ground layer; and
   first and second electrode layers disposed on both sides of the ground layer on the first end of the actuator element and first and second electrode layers disposed on both sides of the ground layer on the second end of the actuator element, so that the first electrode layer on the first end is not connected to the first electrode layer on the second end and the second electrode layer on the first end is not connected to the second electrode layer on the second end.

3. The device as claimed in claim 1, wherein the actuator unit further comprises:
   a first connecting part connected around the optical lens; and
   a second connecting part connected with the supporting unit;
   wherein the at least one actuator element is connected between the first and the second connecting parts, and at least a portion of the at least one actuator element is spaced apart from and substantially parallel to a portion of the first connecting part.

4. The device as claimed in claim 1, wherein the first end of at least one of the plurality of actuator elements is bar-shaped and extends substantially parallel to an edge of a side of the supporting unit, and the second end of the at least one actuator element is connected to the optical lens.

5. The device as claimed in claim 1, wherein:
   the supporting unit has a polygonal shape; and
   each actuator element is connected to a side of the supporting unit.

6. The device as claimed in claim 1, wherein at least one of the plurality of actuator elements comprises a bimorph actuator.

7. The device as claimed in claim 3, wherein at least one of the plurality of actuator elements comprises a layered actuator, which is made up of more than three layers.

8. The device as claimed in claim 1, wherein at least one of the plurality of actuator elements comprises a dielectric elastomer.

9. The device as claimed in claim 1, wherein at least one of the plurality of actuator elements consists of one of a ferroelectric polymer and a relaxer ferroelectric polymer.

10. The device as claimed in claim 1, wherein at least one of the plurality of actuator elements comprises a polymer material consisting of one of an ion-irradiated P(VDF-TrFE) and P(VDF-TrFE-CFE).

11. The device as claimed in claim 8, wherein the dielectric elastomer consists of one of an acrylate and a silicone.

12. A varifocal optical device, comprising:
    a supporting frame;
    an actuator unit mounted on the supporting frame; and
    a lens, mounted on the actuator unit;
    wherein the actuator unit comprises:
      at least two actuator elements, each having a first end connected to an inner portion of the supporting frame and a second end connected to the lens, and each having a layered structure comprising an inner ground electrode, first upper and lower electrodes at the first end, and second upper and lower electrodes at the second end, such that the first and second upper electrodes are not connected and the first and second lower electrodes are not connected, such that, if a voltage is applied, the first end of the actuator unit bends in a first direction and the second end of the actuator unit bends in a second direction, opposite the first direction, providing a displacement of the lens along an optical axis of the lens,
    wherein the at least two actuator elements are driven separately from one another.

* * * * *